(12) United States Patent
Ebiko (10) Patent No.: US 8,925,598 B2
(45) Date of Patent: Jan. 6, 2015

(54) PNEUMATIC TIRE

(75) Inventor: Masahiro Ebiko, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/805,214

(22) PCT Filed: Sep. 22, 2011

(86) PCT No.: PCT/JP2011/005344
§ 371 (c)(1),
(2), (4) Date: Dec. 18, 2012

(87) PCT Pub. No.: WO2012/066714
PCT Pub. Date: May 24, 2012

(65) Prior Publication Data
US 2013/0092301 A1    Apr. 18, 2013

(30) Foreign Application Priority Data
Nov. 17, 2010    (JP) .................. 2010-256745

(51) Int. Cl.
*B60C 11/13*    (2006.01)
*B60C 11/04*    (2006.01)
*B60C 11/11*    (2006.01)
*B60C 11/00*    (2006.01)
*B60C 11/03*    (2006.01)

(52) U.S. Cl.
CPC ............. *B60C 11/11* (2013.01); *B60C 11/1315* (2013.04); *B60C 11/1323* (2013.04); *B60C 11/0083* (2013.04); *B60C 11/1392* (2013.04); *B60C 11/0304* (2013.04); *B60C 2011/0346* (2013.04); *B60C 2011/0388* (2013.04); *B60C 2011/0383* (2013.04); *B60C 2011/0381* (2013.04)

USPC .............. 152/209.14; 152/209.15; 152/209.8; 152/209.24

(58) Field of Classification Search
USPC .................. 152/209.14, 209.15, 209.28, 900, 152/209.8, 209.24
See application file for complete search history.

(56) References Cited

U.S. PATENT DOCUMENTS 4,299,264 A * 11/1981 Williams .................. 152/209.18
4,722,378 A * 2/1988 Carolla et al. ........... 152/209.15

(Continued)

FOREIGN PATENT DOCUMENTS

CN    101014660 A    8/2007
CN    101472749 A    7/2009

(Continued)

OTHER PUBLICATIONS

English translation of JP02-179508, dated Jul. 1990.*

(Continued)

*Primary Examiner* — Justin Fischer
*Assistant Examiner* — Robert Dye
(74) *Attorney, Agent, or Firm* — Global IP Counselors, LLP (57) ABSTRACT

A pneumatic tire includes, in a tread portion, a pair of circumferential main grooves extending and a land portion provided between the pair of circumferential main grooves and extending in the tire circumferential direction. The land portion includes a bulging portion bulging in a second arc shape in a tire radial direction as a sectional outline of a tread surface of the land portion and chamfered portions connected to the bulging portion and extending straight toward respective groove walls of the circumferential main grooves. A portion of the bulging portion bulges in the tire radial direction with respect to a virtual tread profile line which is determined by a first arc shape in a sectional shape of the tread portion. A maximum bulging amount is 0.1 to 0.8 mm. The virtual tread profile line extends across the chamfered portions.

19 Claims, 5 Drawing Sheets

(56) References Cited

U.S. PATENT DOCUMENTS

| | | | |
|---|---|---|---|
| 5,370,167 A | 12/1994 | Kogure et al. | |
| 5,425,406 A * | 6/1995 | Swift et al. | 152/209.8 |
| 6,341,633 B1 * | 1/2002 | Adlon et al. | 152/209.3 |
| 7,832,439 B2 * | 11/2010 | Ikeda et al. | 152/209.16 |
| 2008/0033103 A1 * | 2/2008 | Kameda et al. | 524/571 |
| 2010/0101695 A1 * | 4/2010 | Ueda | 152/209.15 |
| 2010/0212795 A1 * | 8/2010 | Murata | 152/209.18 |
| 2011/0079334 A1 * | 4/2011 | Bott et al. | 152/209.14 |

FOREIGN PATENT DOCUMENTS

| | | | |
|---|---|---|---|
| CN | 101801687 A | | 8/2010 |
| EP | 1 661 732 A2 | | 5/2006 |
| EP | 2 067 636 A1 | | 10/2008 |
| JP | 02-179508 | * | 7/1990 |
| JP | 04-314605 A | | 11/1992 |
| JP | 05-065609 U | * | 8/1993 |
| JP | 05-294111 A | | 11/1993 |
| JP | 2000-071720 A | | 3/2000 |
| JP | 2000-142030 A | | 5/2000 |
| JP | 2001-018616 A | | 1/2001 |
| JP | 2009-067244 A | | 4/2009 |
| JP | 2009-298315 A | | 12/2009 |
| JP | 4453435 B | | 4/2010 |

OTHER PUBLICATIONS

English machine translation of JP05-065609, dated Aug. 1993.*
International Search Report of corresponding International Application No. PCT/JP2011/005344, dated on Dec. 16, 2011.
Office Action of the corresponding Japanese Patent Office Action No. 2010-256745, dated May 10, 2011.
Chinese Office Action of the corresponding Chinese patent application No. 201180020864.4, dated Jul. 23, 2013.

* cited by examiner

Table 1

| Table 1 | Conventional example 1 | Conventional example 2 | Comparative example 1 | Comparative example 2 | Comparative example 3 | Example 1 | Example 2 | Example 3 |
|---|---|---|---|---|---|---|---|---|
| Virtual profile line radius $R_1$ (mm) | 500 | 800 | 800 | 800 | 800 | 800 | 800 | 800 |
| Bulging portion radius $R_2$ (mm) of continuously extending land portion | 501 | 150 | 330 | 330 | 100 | 200 | 600 | 150 |
| Maximum bulging amount H (mm) | 1.0 | 0.5 | 0.5 | 0.0 | 1.0 | 0.5 | 0.1 | 0.8 |
| Presence or absence of chamfered portion | present | absent | present | present | present | present | present | present |
| Presence or absence of intersection between chamfered portions and virtual profile line | absent | — | absent | absent | present | present | present | present |
| Chamfered depth D (mm) | 0.5 | — | 0.2 | 0.2 | 0.5 | 0.5 | 0.5 | 0.5 |
| Chamfered width W (mm) | 0.5 | — | 0.5 | 0.5 | 0.5 | 0.5 | 0.5 | 0.5 |
| Thickness under groove (mm) | 2.5 | 2.5 | 2.5 | 2.5 | 2.5 | 2.0 | 2.0 | 2.0 |
| Point height | absent | absent | absent | absent | absent | absent | absent | absent |
| Hydroplaning resistance | 100 | 98 | 100 | 95 | 107 | 102 | 100 | 105 |
| Wear resistance | 3 | 1 | 2 | 3 | 2 | 4 | 4 | 3 |
| Rolling resistance | 100 | 105 | 105 | 108 | 103 | 110 | 108 | 106 |
| Groove crack | 4 | 4 | 4 | 4 | 4 | 4 | 4 | 4 |

Fig. 7

| Table 2 | Example 4 | Example 5 | Example 6 | Example 7 |
|---|---|---|---|---|
| Virtual profile line radius $R_1$ (mm) | 800 | 800 | 800 | 800 |
| Bulging portion radius $R_2$ (mm) of continuously extending land portion | 200 | 200 | 200 | 200 |
| Maximum bulging amount H (mm) | 0.5 | 0.5 | 0.5 | 0.5 |
| Presence or absence of chamfered portion | present | present | present | present |
| Presence or absence of intersection between chamfered portions and virtual profile line | present | present | present | present |
| Chamfered depth D (mm) | 0.5 | 0.5 | 0.5 | 0.5 |
| Chamfered width W (mm) | 0.5 | 0.5 | 0.5 | 0.5 |
| Thickness under groove (mm) | 1.0 | 2.5 | 0.5 | 3.0 |
| Point height | absent | absent | absent | absent |
| Hydroplaning resistance | 103 | 101 | 105 | 101 |
| Wear resistance | 4 | 4 | 4 | 4 |
| Rolling resistance | 115 | 106 | 120 | 102 |
| Groove crack | 4 | 4 | 2 | 4 |

PNEUMATIC TIRE

CROSS-REFERENCE TO RELATED APPLICATIONS

This U.S. National stage application claims priority under 35 U.S.C. §119(a) to Japanese Patent Application No. 2010-256745, filed in Japan on Nov. 17, 2010, the entire contents of Japanese Patent Application No. 2010-256745 are hereby incorporated herein by reference.

BACKGROUND

1. Field of Invention

The present invention relates to a pneumatic tire having a tread pattern.

2. Background Information

Conventionally, in order to obtain an efficient drainage of water which entered between a tread pattern and the ground, a contact patch of a continuously extending land portion sandwiched between two tire circumferential main grooves and extending in a tire circumferential direction is formed in bulging shapes at a front portion of a leading edge and at a rear portion of a trailing edge in a pneumatic tire. In this way, the water which collided with the continuously extending land portion is divided into the tire circumferential main grooves located on opposite sides and efficiently drains rearward from the trailing edge.

In the above method, however, it is impossible to form the contact patch shape of the continuously extending land portion into an excessively bulging shape in the tire contact patch shape of the tire, because it reduces a contact area in contact with the ground. Reduction of the contact area causes less quality of handling and stability performance. Under this circumstance, there is a known pneumatic tire in which handling and stability and hydroplaning resistance (hydroplaning preventing performance) are compatible with each other at high level as described in Japanese Patent No. 4453435.

To put it concretely, the pneumatic tire is a pneumatic tire in which a pair of main grooves continuously extending in a tire circumferential direction on opposite sides of a tire equator (tire center line) is provided in a tread portion and a center rib continuous in the tire circumferential direction is formed between these main grooves. In this pneumatic tire, a sectional profile line of a tread of the center rib intersects with a virtual tread profile line smoothly connecting a tread surface including opposite contact patch side edges and excluding the center rib, and a central portion in a tire axial direction of the center rib is formed into a smoothly bulging shape toward an outer side of a tire radial direction and swells from the virtual tread profile line to the outer side of the tire radial direction. A swelling amount A of the center rib from the virtual tread profile line is 0.5 mm to 3.0 mm, while ridge lines are formed by the tread face and side walls of the center rib, and the ridges sink at opposite edge portions of the center rib into an inner side of the virtual tread profile line in the tire radial direction.

SUMMARY

The contact patch shapes are designed to be rectangular in many pneumatic tires in order to achieve low rolling resistance to adapt to a recent demand for the low rolling resistance. Such a contact patch shape of the tire on continuously extending land portion sandwiched between the two tire circumferential main grooves of the pneumatic tire may reduce the hydroplaning resistance in some cases, because the contact patch shape is not bulging forward at the leading edge.

In other cases, groove widths of tire circumferential main grooves are increased in order to enhance the hydroplaning resistance and a thickness under each of the tire circumferential main grooves (a thickness from a belt outermost layer surface under the groove to a groove bottom surface or, if there is a belt cover layer, a thickness from a surface of the belt cover layer to the groove bottom surface) is reduced in order to reduce the rolling resistance, thereby trying to achieve both enhancement of the hydroplaning resistance and reduction of the rolling resistance. In these cases, belt waving in which the belt waves inward in a tire radial direction at positions of the tire circumferential main grooves occurs. Therefore, when the pneumatic tire having the wave shaped belt is inflated, the belt of the wave shaped belt changes into a smooth arc shape due to the internal pressure and therefore a tread profile line which is an outline of a tread on a tire meridional section changes as well. As a result, the contact patch shape is recessed at a front portion of the leading edge and at a rear portion of the trailing edge in many cases, which is detrimental to the hydroplaning resistance. A similar problem occurs in the above-described pneumatic tire known as prior art. Moreover, known feather-edge wear which is feather-shaped wear is likely to occur on one of edges of the continuously extending land portion of such a pneumatic tire and wear resistance reduces.

Therefore, it is an object of the present invention to provide a pneumatic tire in which one of hydroplaning resistance and wear resistance can be maintained and the other can be enhanced, while rolling resistance can be reduced.

There is an aspect of the invention provided with a pneumatic tire having a tread pattern. The tire includes, in a tread portion thereof, a pair of circumferential main grooves extending in a tire circumferential direction; and a land portion provided between the pair of circumferential main grooves and extending in the tire circumferential direction, the land portion including a bulging portion bulging in an arc shape in a tire radial direction as a sectional outline of a tread surface of the land portion and chamfered portions connected to the bulging portion and extending straight toward respective groove walls of the circumferential main grooves.

A portion of the bulging portion bulges in the tire radial direction with respect to a virtual tread profile line of a tread surface of the tread portion including opposite contact patch ends of the tire, the virtual tread profile line determined by an arc shape of a radius of curvature in a sectional shape of the tread portion. A maximum bulging amount of the bulging portion with respect to the virtual tread profile line ranges from 0.1 to 0.8 mm. The chamfered portions are provided on opposite sides of the bulging portion in a tire width direction- .the virtual tread profile line extends across the chamfered portions.

A distance between a groove bottom of each of the circumferential main grooves in the tread portion and a surface of an outermost belt layer of a belt portion of the pneumatic tire or a belt cover layer provided to the belt portion ranges preferably from 1.0 to 2.5 mm.

A ratio of an average value of respective groove widths of the circumferential main grooves to an average value of a width of the land portion in the tire width direction ranges preferably from 0.4 to 0.8. JIS hardness (JIS 10253) of rubber used for the tread portion ranges preferably from 60 to 78 at a temperature of 20 degree.

A rectangular rate of a contact patch shape of the tread portion ranges preferably from 0.85 to 0.98.

At least one of the circumferential main grooves may change a groove position in a first wave shape in the tire width direction on the tread surface.

At least one of the circumferential main grooves may change a groove position in a second wave shape in the tire width direction on the tire tread groove bottom.

A cycle of the first wave shape may be longer than a cycle of the second wave shape.

There is another aspect of the invention provided with a pneumatic tire having a tread pattern. The tire includes, in a tread portion thereof, at least three circumferential main grooves extending in a tire circumferential direction, one of the circumferential main grooves provided on a tire center line of the tire; and at least two land portions on opposite sides of the one circumferential main groove. Each of the land portions are provided between two of the circumferential main grooves and extending in the tire circumferential direction, and each of the land portions include a bulging portion bulging in an arc shape in a tire radial direction as a sectional outline of a tread surface of the land portion and chamfered portions connected to the bulging portion and extending straight toward respective groove walls of the circumferential main grooves. A portion of the bulging portion bulges in the tire radial direction with respect to a virtual tread profile line of a tread surface of the tread portion include opposite contact patch ends of the tire, and the virtual tread profile line is determined by an arc shape of a radius of curvature in a sectional shape of the tread portion. A maximum bulging amount of the bulging portion with respect to the virtual tread profile line ranges from 0.1 to 0.8 mm. The chamfered portions are provided on opposite sides of the bulging portion in a tire width direction. The virtual tread profile line extends across the chamfered portions.

According to the above-described pneumatic tire, it is possible to at least maintain one of hydroplaning resistance and wear resistance and enhance the other, while reducing rolling resistance.

BRIEF DESCRIPTION OF DRAWINGS

FIG. 6 indicates the specifications and evaluation results of the conventional examples 1, 2, the comparative examples 1 to 3, and the examples 1 to 3; and FIG. 7 indicates the specifications and evaluation results of the examples 4 to 7.

DESCRIPTION OF EMBODIMENTS

Figure 1:
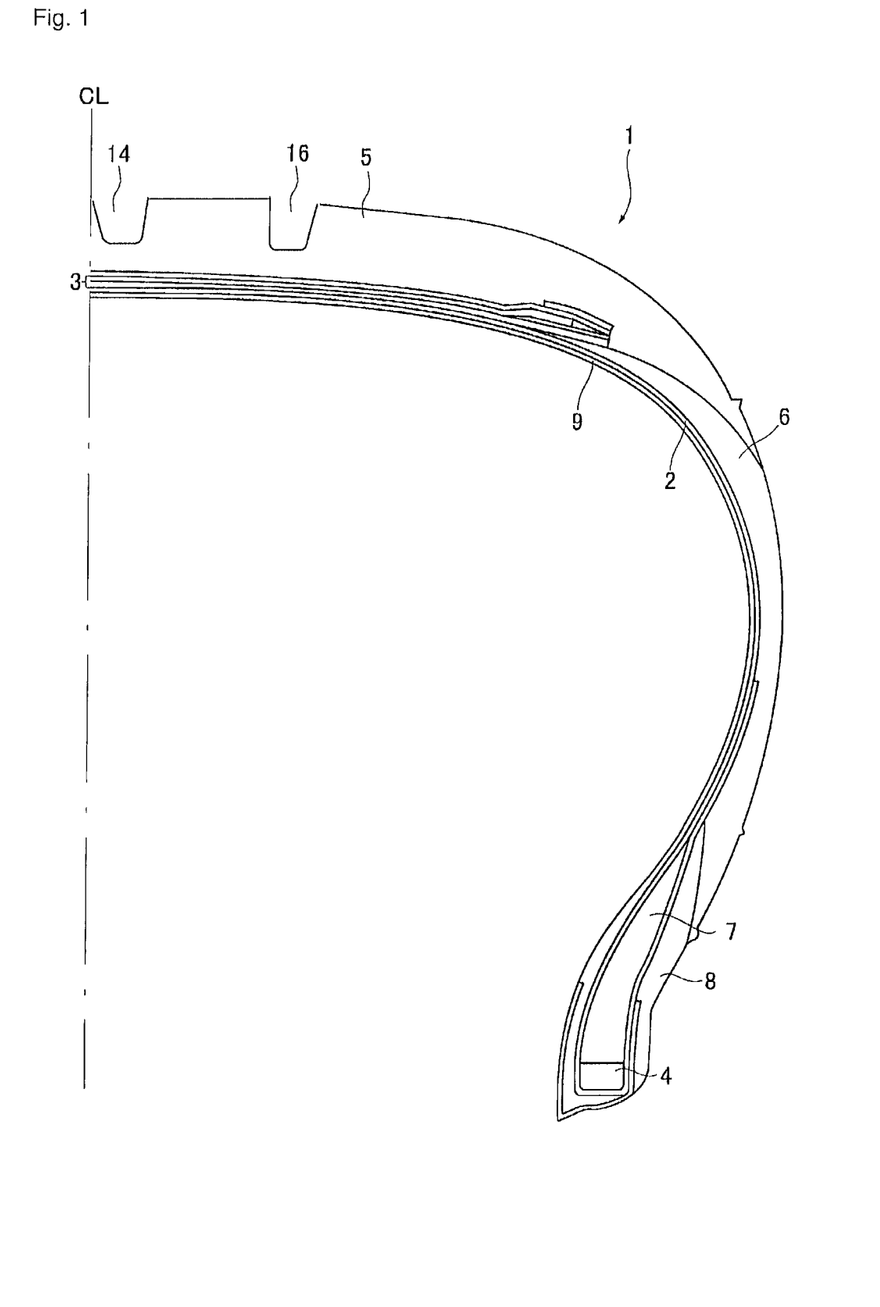
FIG. 1 is a cross sectional view illustrating a right half portion of the pneumatic tire according to a disclosed embodiment.

A pneumatic tire of the invention will be described below in detail. FIG. 1 is a cross sectional view illustrating a right half portion of the pneumatic tire 1 according to a disclosed embodiment. The structure and the rubber members of the tire will be described hereinafter but the structure and the rubber members are not limited. Other known tire structure and rubber members or new ones may be employed as a structure and rubber members of the tire 1.

A pneumatic tire (hereafter referred to as "tire") 1 of an embodiment includes a carcass ply 2, belts 3 and bead cores 4, as structural core members. Around the structural core members, a tread rubber member 5, side wall rubber members 6, bead filler rubber members 7, rim cushion members 8 and an inner liner rubber member 9 are provided.

Figure 2:
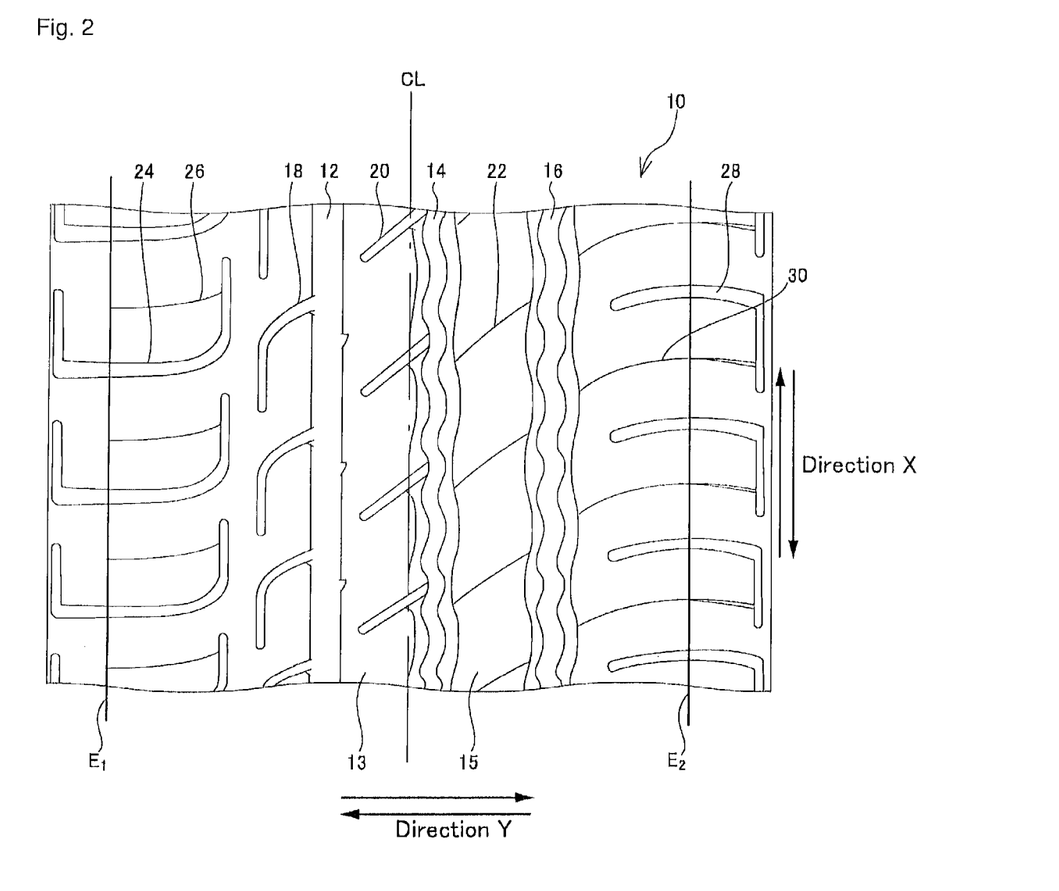
FIG. 2 is a developed view of a portion of a tread pattern in a disclosed embodiment.

In the description, a tire circumferential direction refers to a rotating direction of a tread surface of the tire when the tire is rotated about a tire rotation axis. A tire width direction refers to a direction parallel to the tire rotation axis. In FIG. 2 which will be described, a direction X is the tire circumferential direction and a direction Y is the tire width direction. A tire radial direction (radial direction) refers to a direction radially extending from the tire rotation axis. An outer side in the tire width direction refers to each of or one of the opposite sides away from a tire center line CL.

The carcass ply 2 is a core member, in a toroidal shape, having organic cords coated with rubber and arranged between both of annular bead cores 16. Two layers of the belts 3 are provided outside the carcass ply 2 in the tire radial direction. The belts 3 are core members having steel cords coated with rubber. Steel cords of each layer of the belts 3 are arranged to be inclined at a predetermined angle, for example a certain angle ranging 20 degrees to 30 degrees from the tire circumferential direction. A lower layer of the belts 3 is wider in the tire width direction than an upper layer thereof. The inclination directions of the steel cords of the layers are opposites from each other with respect to the tire center line CL, which suppresses an expansion of the carcass ply 2 due to tire inflation pressure.

The tread rubber member 5 is provided outside the belts 3 in the tire radial direction. Each of the side wall rubber members 6 is arranged to be connected to the tread rubber member 5 at an end thereof to form a side wall portion. Each of the rim cushion rubber member 8 is arranged to be connected to the side wall rubber members 6 at an ends thereof to have a contact with a rim on which the tire 1 is mounted to a rim. Each of the bead filler rubber members 7 is arranged to be interposed between an outward turned-up portion of the carcass ply 2 and an inside portion of the carcass ply 2 outside the bead core 4 in the tire radial direction. The inner liner rubber member 9 is arranged on the whole inner surface of the tire 1 to face a tire cavity region filled with inflated air between the tire 1 and the rim. The tire 1 includes belt cover sheets covering the belts 3, which have organic cords coated with rubber. The tire 1 of the embodiment includes two layers of belts 3, however the tire 1 may include three layers or more of the belts 3.

FIG. 2 is a developed view of a portion of a tread pattern 10 in a present embodiment. The tread pattern 10 is an asymmetric pattern with respect to a tire center line CL.

A tire to which the tread pattern 10 is applied is a tire defined in Chapter A in JATMA YEAR BOOK 2009 (Japan Automobile Tyre Manufacturers Association Standards), for example. Alternatively, the pneumatic tire in the invention can be applied to a tire for a small truck defined in Chapter B or a tire for a truck or a bus defined in Chapter C.

The tread pattern 10 includes tire circumferential main grooves 12, 14, and 16 and continuously extending land portions 13 and 15 sandwiched between these tire circumferential main grooves 12, 14, and 16 and continuously extending in the tire circumferential direction. The continuously extending land portion 13 is provided between the tire circumferential main groove 12 and the tire circumferential main groove 14 and the continuously extending land portion 15 is provided between the tire circumferential main groove 14 and the tire circumferential main groove 16.

In the continuously extending land portion 13, lug grooves 20 extending in a direction inclined with respect to the tire width direction from the tire circumferential main groove 14 and closed on their ways are provided.

In the continuously extending land portion 15, sipes 22 extending in a direction inclined with respect to the tire width direction are provided between the tire circumferential main groove 14 and the tire circumferential main groove 16.

On an outer side in the tire width direction (a left side in FIG. 2) of the tire circumferential main groove 12, lug grooves 18 extending from the tire circumferential main groove 12 are provided and turn in the tire circumferential direction and are closed on their ways.

On the outer side in the tire width direction of the tire circumferential main groove 12, shoulder lug grooves 24 are extending substantially in the tire width direction from a tread end in the tire width direction and bend in the tire circumferential direction and are closed on their ways. Between the shoulder lug groove 24 and the shoulder lug groove 24 adjacent to each other in the tire circumferential direction, a sipe 26 curving and extending in the tire width direction is provided and the sipe 26 is connected to a portion of the shoulder lug groove 24 extending in the tire circumferential direction.

Although the continuously extending land portions 13 and 15 which are land portions continuous in the tire circumferential direction are provided in the embodiment, land portions provided with lug grooves connecting the lire circumferential main grooves 12, 14, and 16 may be provided in place of the continuously extending land portions 13 and 15.

On the other hand, on an outer side in the tire width direction (a right side in FIG. 2) of the tire circumferential main groove 16, shoulder lug grooves 28 are curving and extending substantially in the tire width direction from a tread end in the tire width direction and closed on their ways. Between the shoulder lug groove 28 and the shoulder lug groove 28 adjacent to each other in the tire circumferential direction, a sipe 30 curving and extending inward in the tire width direction from the tread end in the tire width direction and connected to the tire circumferential main groove 16 is provided.

The tire circumferential main grooves 14 and 16 are provided with point heights which change groove position (position in the tire width direction) in wave shapes in the tire width direction in a certain amplitude and in a certain cycle on the tread surface of the tire. Similarly, on tire tread groove bottoms, groove positions (positions in the tire width direction) change in wave shapes in the tire width direction in a certain amplitude and in a certain cycle. Groove walls are smoothly connected between the tire tread surface and the tread groove bottom. The cycle of the point heights on the tire tread surface is longer than the cycle of the point heights on the tire tread groove bottom. Therefore, inclination angles of the groove wall faces of each of the tire circumferential main grooves change along the tire circumferential direction. The inclination angles of the groove wall faces are preferably 10 to 40 degrees. By providing the point heights in this manner, the positions of the tire circumferential main grooves (positions in the tire width direction) and the inclination angles of the groove wall faces change along the tire circumferential direction and therefore it is possible to disperse a force exerted on an unvulcanized tire from a metal mold for vulcanization when the mold for vulcanization, on which the tread pattern of the tire is formed, is forced against the unvulcanized tire. Therefore, the belt waving becomes less liable to occur. From this view point, the point heights are preferably provided. Although the groove positions of each of the tire circumferential main grooves 14 and 16 change along the tire circumferential direction in the different cycles between the tread surface and the groove bottom of the tire, the groove positions may change in the same cycle.

The tire circumferential main groove 12 is in a groove shape extending straight in the tire circumferential direction and is not provided with the point heights.

Although the point heights are provided to the tire circumferential main grooves 14 and 16 in the embodiment, they may not necessarily be provided. Although the tread pattern 10 in the embodiment is the asymmetric pattern with respect to the tire center line CL, it is not limited to the asymmetric pattern but may be a point-symmetric pattern or a line-symmetric pattern.

Figure 3:
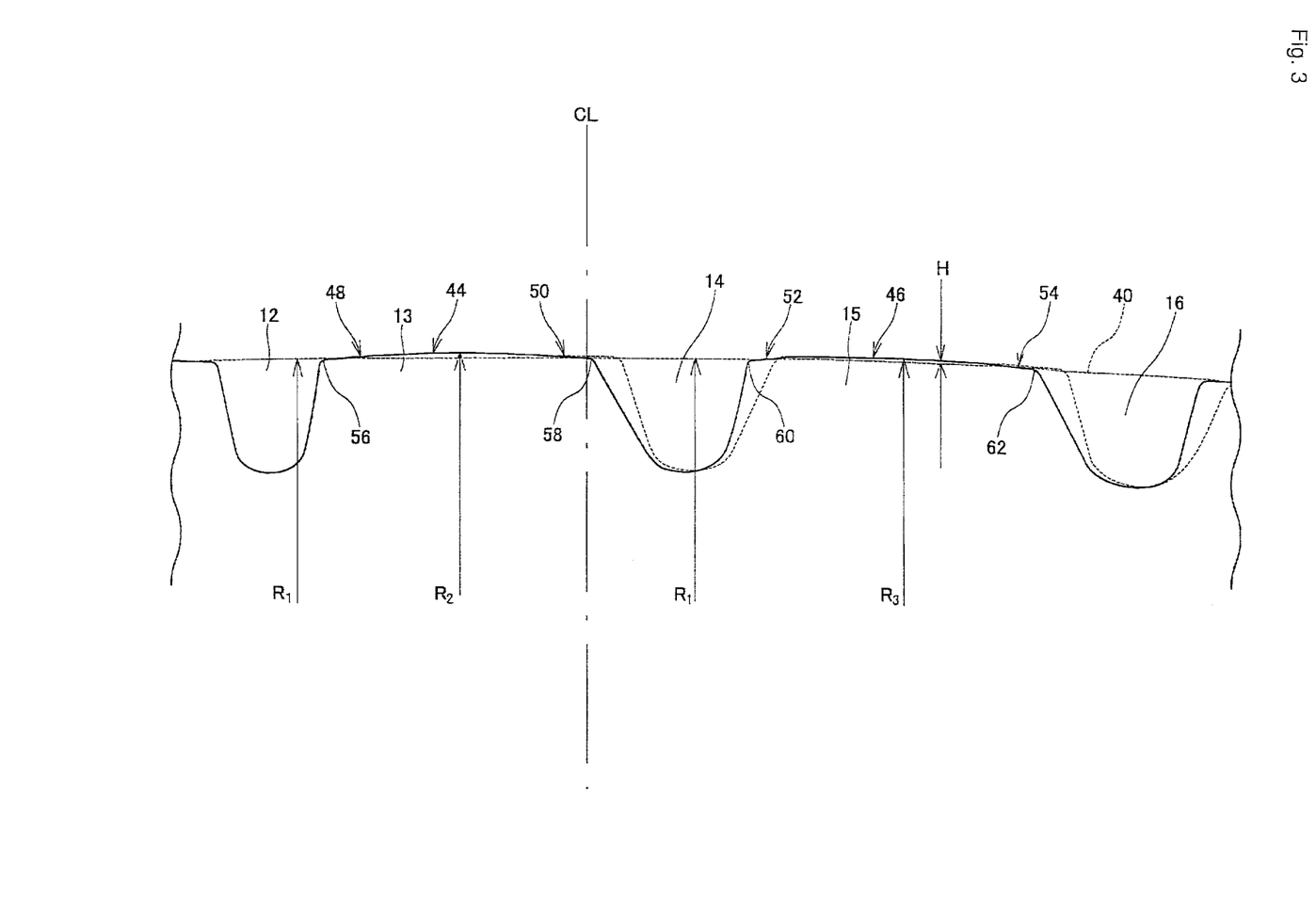
FIG. 3 is a drawing illustrating a sectional profile line of a tread surface at continuously extending land portions sandwiched between tire circumferential main grooves in the embodiment.

FIG. 3 is a drawing illustrating a sectional profile line of the tread surface at the continuously extending land portions 13 and 15 sandwiched between the tire circumferential main grooves 12, 14, and 16.

In such a tread pattern 10, a virtual tread profile line 40 (a dotted line in FIG. 3) of the tread surface including opposite contact patch ends is determined by a first arc shape of a radius $R_1$. The opposite contact patch ends refer to end portions of a contact patch shape in the tire width direction and straight lines $E_1$ and $F_2$ in FIG. 2 are located on the positions of the contact patch ends in the tire width direction. The positions of the contact patch ends in the tire width direction are positions of the end portions of the contact patch shape in the tire width direction when the tire is mounted to a normal rim, filled with normal inflation pressure, and brought into contact with a horizontal face under a condition that 100% of a normal load is a load. Here, the normal rim is an "applicable rim" defined in JATMA, a "Design Rim" defined in TRA, or a "Measuring Rim" defined in ETRTO. The normal inflation pressure is a "maximum air pressure" defined in JATMA, a maximum value of "TIRE LOAD LIMITS AT VARIOUS COLD INFLATION PRESSURES" defined in TRA, or "INFLATION PRESSURES" defined in ETRTO. The normal load is a "maximum load capacity" defined in JATMA, a maximum value of "TIRE LOAD LIMITS AT VARIOUS COLD INFLATION PRESSURES" defined in TRA, or "LOAD CAPACITY" defined in ETRTO.

Then, the tread pattern 10 includes bulging portions 44 and 46, chamfered portions 48, 50, 52, and 54, and ridge portions 56, 58, 60, and 62. The sectional profile line illustrated in FIG. 3 will be described below in detail.

The bulging portions 44 and 46 are formed in a second arc shape of a radius $R_2$ and partially bulging in the tire radial direction (radial direction) with respect to the virtual tread profile line 40. The chamfered portions 48, 50, 52, and 54 are in shapes of flat faces connected to the bulging portions 44 and 46 and extending toward the tire circumferential main grooves 12, 14, and 16, respectively. Although the chamfered portions 48, 50, 52, and 54 do not have to be connected smoothly to the bulging portions 44 and 46, it is preferable to smoothly connect them to the bulging portions 44 and 46. "To be connected smoothly" means that an inclination angle continuously changes at a connection point.

The ridge portions 56, 58, 60 and 62 are portions where the continuously extending land portions 13 and 15 are respectively connected to the tire circumferential main grooves 12, 14, and 16 and are provided at ends of the chamfered portions 48, 50, 52, and 54. At the ridge portions 56, 58, 60 and 62, the chamfered portions 48, 50, 52, and 54 and the wall faces of the circumferential grooves 14 and 16 are connected at angles. The ridge portions 56, 58, 60 and 62 may technically be portions curved with extremely small radiuses of curvature. In this case, positions of the ridge portions 56, 58, 60 and 62 in the tire width direction may be determined by positions of intersection of extended lines of the straight groove wall faces of the tire circumferential main grooves 12, 14, and 16 and straight lines of the chamfered portions 48, 50, 52, and 54.

A maximum bulging amount H of the bulging portions 44 and 46 from the virtual tread profile line 40 is 0.1 to 0.8 mm, the chamfered portions 48, 50, 52, and 54 are provided between the bulging portions 44 and 46 and the ridge portions 56, 58, 60 and 62 and the virtual tread profile line 40 extends across the chamfered portions 48, 50, 52, and 54.

The radius $R_1$ of the first arc shape in the virtual tread profile line 40 is 600 to 800 mm, for example, and a radius $R_2$ of a second arc shape is 150 mm to 600 mm, for example, in a tire size of 185/65R15.

Figure 4:
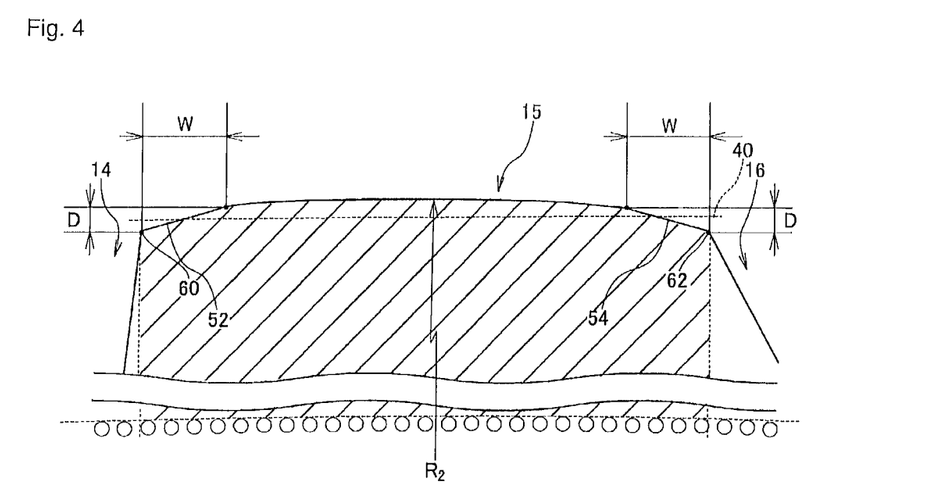
FIG. 4 is an enlarged view of the continuously extending land portion and the sectional profile line in the embodiment.
Figure 5:
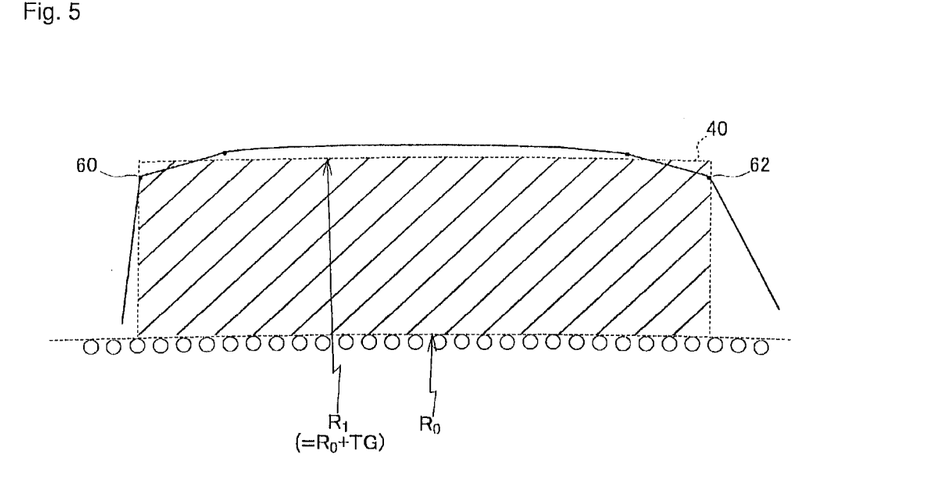
FIG. 5 is a drawing for explaining a method of determining the sectional profile line illustrated in FIG. 3.

FIG. 4 is a drawing explaining the continuously extending land portion 15 illustrated in FIG. 2 in an understandable way by emphasizing a shape of the continuously extending land portion 15. FIG. 5 is a drawing for explaining a method of determining the virtual tread profile line 40. Because the continuously extending land portion 13 has a similar shape to the continuously extending land portion 15, the continuously extending land portion 15 will be described as a representative in the following description.

The virtual tread profile line 40 illustrated in FIG. 4 is formed by the first arc shape of the radius $R_1$ between positions $E_1$ and $E_2$ in the tire width direction (the positions in the tire width direction of the contact patch ends). The continuously extending land portions 13 and 15 bulge from the virtual tread profile line 40 of the first arc shape of the radius $R_1$ and therefore it is impossible to obtain a radius $R_1$ of the virtual tread profile line 40 by using sectional outlines of the tread surfaces of the continuously extending land portions 13 and 15. Therefore, the virtual tread profile line 40 is obtained as described later by utilizing an arc shape of a radius $R_0$ of a belt obtained by utilizing an outline of a belt surface of an outermost layer (a belt cover layer surface, if there is a belt cover layer) between the positions $E_1$ and $E_2$ in the tire width direction. The radius $R_1$ obtained by utilizing the arc shape of the radius $R_0$ of the belt substantially corresponds with a radius determined by the sectional outline of the tread surface in a case of the pneumatic tire having the sectional outlines of the continuously extending land portions not bulging from the virtual profile line. The sectional profile line of the belt layer surface of the outermost layer (the belt cover layer surface, if there is the belt cover layer) is obtained by measuring with an X-ray CT scanner, for example. At this time, the tire is measured under a condition that the tire is mounted to the above-described normal rim and filled with the above-described normal inflation pressure. The arc shape of the radius $R_0$ of the belt is obtained by using a point of the belt layer surface of the outermost layer, which is on the tire center line CL, and two points of the surface, which are away from the center line CL at distances of halves of a contact patch width in opposite directions in the tire width direction.

By using the obtained arc shape of the radius $R_0$ of the belt, the virtual tread profile line 40 of the radius $R_1$ is determined as follows.

In the tire sectional view in FIG. 4, a center point of the arc shape (a center point of a circle) of the radius $R_0$ of the belt is fixed, a length obtained by adding an average tread rubber thickness TG to the value of the radius $R_0$ is defined as the radius $R_1$, and the arc shape of the radius $R_1$ is obtained as the first arc shape of the virtual tread profile line 40.

Here, the average tread rubber thickness TG is a value obtained by dividing an area of a region which is discussed later by a distance between the ridge portion 60 and the ridge portion 62 in the tire width direction. The region is partitioned between the ridge portion 60 and the ridge portion 62 and between the belt layer surface of the outermost layer (the belt cover layer surface, if there is the belt cover layer) and the tread surface by a distance between the ridge portion 60 and the ridge 62 in the tire width direction. In other words, the average tread rubber thickness TG is determined so that an area of a hatched region illustrated in FIG. 4 and an area of a hatched region illustrated in FIG. 5 become equal to each other.

The tread pattern 10 in the embodiment includes the continuously extending land portion 15 besides the continuously extending land portion 13. Therefore, by obtaining an average tread thickness of the continuously extending land portion 13 and the continuously extending land portion 15 and also land portions other than the continuously extending land portions 13 and 15 and not having the bulging portions (portions of the tread face in contact with the ground), it is possible to obtain the virtual tread profile line 40 of the first arc shape having the radius $R_1$.

A maximum bulging amount H of the bulging portions 44 and 46 from the virtual tread profile line 40 determined by the above method is 0.1 mm to 0.8 mm. If the maximum bulging amount H is smaller than 0.1 mm, the contact patch shape cannot be improved and it is impossible to at least maintain one of the hydroplaning resistance and the wear resistance while enhancing the other. If the maximum bulging amount H is greater than 0.8 mm, contact pressure becomes extremely high at central portions of the continuously extending land portions 13 and 15 and the wear resistance at opposite end portions of the continuously extending land portions 13 and 15 reduces. The chamfered portions 48, 50, 52, and 54 are provided between the bulging portions 44 and 46 and the ridge portions 56, 58, 60 and 62 and perpendicularly intersect with the virtual tread profile line 40. Because the virtual tread profile line 40 and the chamfered portions 48, 50, 52, and 54 intersect with each other, it is possible to at least maintain one of the hydroplaning resistance and the wear resistance while enhancing the other as is clear from examples described later.

Chamfered depths D (see FIG. 4) of the chamfered portions 48, 50, 52, and 54 are preferably 0.3 to 1.0 mm and chamfered widths W (see FIG. 4) are preferably 0.3 to 2.0 mm.

In such a tire, the thicknesses under the tire circumferential main grooves 12 and 14 are preferably 1.0 to 2.5 mm. If the thickness under the grooves is smaller than 1.0 mm, a crack (groove crack) is to be caused in the groove bottom. On the other hand, if the thickness under the groove exceeds 2.5 mm, an improvement of the rolling resistance is decreased.

A ratio of an average value of the groove widths (groove widths on the tread surface) of the tire circumferential main grooves 12 and 14 sandwiching the continuously extending land portion 13 to an average value of a width of the continuously extending land portion 13 in the tire width direction and a ratio of an average value of the groove widths (groove widths on the tread surface) of the tire circumferential main grooves 14 and 16 sandwiching the continuously extending land portion 15 to an average value of a width of the continuously extending land portion 15 are preferably 0.4 to 0.8. Each of the groove widths of the tire circumferential main grooves 12, 14, and 16 refers to a distance between ridges across the groove. The average value of the groove width refers to an average value of changing widths if the groove width changes along the tire circumferential direction. If the groove width is constant in the tire circumferential direction, the average value of the groove width is of course a value of the constant groove width. Each of the groove widths of the tire circumferential main grooves 12 and 14 is a distance between the ridges across the groove. The average value of the width of each of the continuously extending land portions 13 and 15 is an average value of changing widths if the point heights are provided and the width changes along the tire circumferential direction. If the width of the continuously extending land portion is constant in the tire circumferential direction, the average value of the width is of course a value of the constant width. If the ratio is smaller than 0.4, a groove area ratio (a ratio of a groove area to a contact area of the contact patch) becomes small and the hydroplaning resistance reduces. If the ratio exceeds 0.8, the widths of the continuously extending land portions 13 and 15 become narrow and block rigidity in the tire width direction reduces and the resistance to wear including feather-edge wear reduces. The average value of the groove widths of the tire circumferential main grooves 12 and 14 or the tire circumferential main grooves 14 and 16 is 7 to 15 mm, for example, and the widths of the continuously extending land portions 13 and 15 are 15 to 40 mm, for example. The groove depths of the tire circumferential main grooves 12, 14, and 16 are 6 to 11 mm, for example.

If JIS hardness (JIS K6253) of tread rubber used for the tread portion of the tread pattern 10 is 60 to 78 at a temperature of 20 degree, the effect of at least maintaining the hydroplaning resistance while reducing the rolling resistance (reducing a rolling resistance index) as compared with conventional tires. If the JIS hardness is lower than 60, the belt waving becomes less likely to occur and therefore an improvement rate of the hydroplaning resistance reduces. If the JIS hardness exceeds 78, it is difficult to reduce the rolling resistance. Consequently, the greater effect than in the conventional tire can be obtained, if the JIS hardness (JIS K6253) of the tread rubber is 60 to 78 at the temperature of 20 degree.

Moreover, a rectangular rate of the contact patch shape of the tread portion is preferably 0.85 to 0.98. The rectangular rate is obtained from the contact patch shape when the tire is mounted to the normal rim, filled with the normal internal pressure, and brought into contact with the horizontal face, as described above, under 80% load condition of the normal load. The rectangular rate is a value obtained by dividing an average value of tire circumferential contact patch lengths at positions at distances of 25% of the contact patch width away in opposite directions in the tire width direction from a tire center line CL of the contact patch shape by a contact patch length on the tire center line CL. If the rectangular rate is smaller than 0.85, the rolling resistance does not reduce. If the rectangular rate exceeds 0.98, the contact patch shape becomes a rectangle and the hydroplaning resistance reduces.

As the tread pattern 10, it is possible to use a pattern including at least three tire circumferential main grooves extending in the tire circumferential direction and at least two land portions provided between the three tire circumferential main grooves and extending in the tire circumferential direction in a tread portion besides the pattern illustrated in FIG. 2. In this case, it is also possible to employ a pattern in which one of the tire circumferential main grooves is provided on the tire center line CL and continuously extending land portions similar to the above-described continuously extending land portions 13 and 15 and having bulging portions bulging from the virtual profile line are provided on both sides of the one tire circumferential main groove. The two continuously extending land portions in this tread pattern may be provided at positions symmetric with respect to the tire center line CL or at asymmetric positions. In the above-described pattern, it is possible to enhance the hydroplaning resistance by providing the tire circumferential main groove on the tire center line CL on which water most intensively collides and it is possible to further enhance the hydroplaning resistance by providing the continuously extending land portions similar to the continuously extending land portions 13 and 15 on both sides of the tire circumferential main groove.

EXAMPLES

To study effects of the invention, pneumatic tires of a tire size of 185/65R15 were produced while modifying them in various ways. Each of the produced pneumatic tires was mounted to each of four wheels of a motor-assisted drive small passenger car (front-wheel-drive) of 1.5 liter displacement. The hydroplaning resistance was evaluated by driving the vehicle, and the wear resistance (feather-edge wear) was evaluated after a handling performance test on a dry road surface was carried out. On the other hand, whether or not a groove crack is likely to occur was evaluated and the rolling resistance was evaluated by using an indoor drum test.

For evaluation of the hydroplaning resistance, the vehicle was driven while cornering on a road surface of a corner having a radius of 100 m and a water film of a water depth of 10 mm at different traveling speeds and the maximum lateral acceleration at this time was measured and expressed as an index with respect to that in a conventional example 1 expressed as 100. The higher the index, the higher the lateral acceleration is and the higher the hydroplaning resistance is.

For the wear resistance, presence or absence of feather-edge wear on a tread surface after the handling and stability test was checked visually and the wear resistance was evaluated in a five-level rating system according to condition of the wear. The higher the rating, the less the feather-edge wear is. Evaluation 1 indicates the feather-edge wear occurred through the entire tire circumference, evaluation 2 indicates feather-edge wear occurred in a range of 61 to 100% on the tire circumference of a tire circumferential length, evaluation 3 indicates that the feather-edge wear occurred in a range of 31 to 60% on the tire circumference of the tire circumferential length, evaluation 4 indicates that the feather-edge wear occurred in a range of 1 to 30% on the tire circumference of the tire circumferential length, and evaluation 5 indicates that the feather-edge wear did not occur. The evaluation was carried out by five panelists.

Evaluation of the groove crack was carried out at a speed of 80 km/hour on an indoor drum of a diameter of 600 mm, under a load of 10.4 (kN), and with inflation pressure of 350 (kPa). Evaluation of the groove crack was carried out in a five-level rating system. The higher the rating, the less the groove crack occurred. Evaluation 1 indicates that the maximum crack depth was equal to or more than 1 mm, evaluation 2 indicates that the maximum crack depth was equal to or more than 0.3 mm and less than 1 mm, evaluation 3 indicates that the maximum crack depth was equal to or more than 0.1 mm and less than 0.3 mm, evaluation 4 indicates that depths of all the cracks were less than 0.1 mm, and evaluation 5 indicates that the groove crack did not occur.

For the rolling resistance, the rolling resistance of each of the produced pneumatic tires was measured pursuant to ISO28580, by using a drum testing machine of a drum diameter of 1707.6 mm, with inflation pressure of 210 (kPa), under a load of 4.39 (kN), and at a speed of 80 (km/h). An evaluation result is expressed as an index with respect to that in the conventional example 1 expressed as 100 by using an inverse of a measured value. The higher the index, the lower the rolling resistance is.

Conventional Examples 1 and 2, Comparative Examples 1 to 3, and Examples 1 to 7

Specifications of the produced pneumatic tires were as follows.

In the conventional example 1, chamfered portions were provided, a maximum bulging amount H was exceeding 0.8 mm which was an upper limit of the invention, and the chamfered portions and a virtual profile line were not intersecting with each other.

In a conventional example 2, chamfered portions were not provided. Therefore, there were no intersections between the chamfered portions and the virtual profile line.

In a comparative example 1, a maximum bulging height H was in a range of the invention while chamfered portions and a virtual profile line were not intersecting with each other.

In a comparative example 2, a maximum bulging amount H was 0 and chamfered portions and a virtual profile line were not intersecting with each other.

In a comparative example 3, chamfered portions and a virtual profile line were intersecting with each other while a maximum bulging amount H was exceeding the upper limit of the invention. The specifications and evaluation results of the conventional examples 1, 2, the comparative examples 1 to 3, and the examples 1 to 7 are indicated in Table 1 of FIG. 6 and in Table 2 of FIG. 7.

From comparison between the conventional examples 1 and 2, the comparative examples 1 to 3, and the examples 1 to 3 shown in Table 1, it was possible to maintain at least one of the hydroplaning resistance and the wear resistance while enhancing the other and it was possible to enhance the rolling resistance (reduce a rolling resistance coefficient) by setting the maximum bulging amount H to 0.1 to 0.8 mm and causing the chamfered portions and the virtual profile line to intersect with each other.

From the examples 4 to 7 shown in Table 2, it was preferable to set the thickness under the groove to 1.0 to 2.5 mm from viewpoints of suppression of occurrence of the groove crack, reduction of the hydroplaning resistance and improvement of the wear resistance.

Although the pneumatic tire of the invention has been described in detail, it is needless to say that the invention is not limited to the above embodiment and can be improved or modified in various ways without departing from the gist of the invention.

The invention claimed is:

1. A pneumatic tire having a tread pattern, the tire comprising a tread portion including
    a pair of circumferential main grooves extending in a tire circumferential direction; and
    a land portion provided between the pair of circumferential main grooves and extending in the tire circumferential direction, the land portion including a bulging portion bulging in an arc shape in a tire radial direction as a sectional outline of a tread surface of the land portion and chamfered portions connected to the bulging portion and extending straight toward respective groove walls of the circumferential main grooves,
    a portion of the bulging portion bulging in the tire radial direction with respect to a virtual tread profile line of a tire tread surface of the tread portion including opposite contact patch ends of the tire, the virtual tread profile line being determined by an arc shape of a radius of curvature in a sectional shape of the tread portion,
    a maximum bulging amount of the bulging portion with respect to the virtual tread profile line ranging from 0.1 mm to 0.8 mm,
    the chamfered portions being provided on opposite sides of the bulging portion in a tire width direction, such that the bulging portion begins at respective outward ends of the chamfered portions that are located outwardly beyond the virtual tread profile line, respective inward ends of the chamfered portions opposite to the respective outward ends are located inwardly of the virtual tread profile line, and the chamfered portions cross the virtual tread profile line, and
    at least one of the circumferential main grooves changes a groove position in a first wave shape in the tire width direction on the tire tread surface and in a second wave shape in the tire width direction on a tire tread groove bottom, a cycle of the first wave shape is longer than a cycle of the second wave shape, groove walls of the at least one of the circumferential main grooves connected between the tire tread surface and the tread groove bottom are inclined surfaces, with inclination angles of faces of the inclined surfaces changing along the tire circumferential direction and the inclination angles being in a range of 10 to 40 degrees.

2. The pneumatic tire according to claim 1, wherein a distance between a groove bottom of each of the circumferential main grooves in the tread portion and a surface of an outermost belt layer of a belt portion of the pneumatic tire or a belt cover layer provided to the belt portion ranges from 1.0 mm to 2.5 mm.

3. The pneumatic tire according to claim 2, wherein a ratio of an average value of respective groove widths of the circumferential main grooves to an average value of a width of the land portion in the tire width direction ranges from 0.4 to 0.8.

4. The pneumatic tire according to claim 3, wherein JIS hardness (JIS K6253) of rubber used for the tread portion ranges from 60 to 78 at a temperature of 20 degrees.

5. The pneumatic tire according to claim 2, wherein JIS hardness (JIS K6253) of rubber used for the tread portion ranges from 60 to 78 at a temperature of 20 degrees.

6. The pneumatic tire according to claim 2, wherein a rectangular rate of a contact patch shape of the tread portion ranges from 0.85 to 0.98.

7. The pneumatic tire according to claim 1, wherein a ratio of an average value of respective groove widths of the circumferential main grooves to an average value of a width of the land portion in the tire width direction ranges from 0.4 to 0.8.

8. The pneumatic tire according to claim 7, wherein JIS hardness (JIS K6253) of rubber used for the tread portion ranges from 60 to 78 at a temperature of 20 degrees.

9. The pneumatic tire according to claim 7, wherein a rectangular rate of a contact patch shape of the tread portion ranges from 0.85 to 0.98.

10. The pneumatic tire according to claim 1, wherein JIS hardness (JIS K6253) of rubber used for the tread portion ranges from 60 to 78 at a temperature of 20 degrees.

11. The pneumatic tire according to claim 10, wherein a rectangular rate of a contact patch shape of the tread portion ranges from 0.85 to 0.98.

12. The pneumatic tire according to claim 1, wherein a rectangular rate of a contact patch shape of the tread portion ranges from 0.85 to 0.98.

13. The pneumatic tire according to claim 1, wherein
    the virtual tread profile line is determined by a first arc shape of a first radius of curvature; and
    the bulging portion bulges in a second arc shape of a second radius of curvature which is less than the first radius of curvature in a tire radial direction.

14. The pneumatic tire according to claim 1, wherein
    each of the main grooves includes point heights; and
    the land portion includes sipes extending between the main grooves having the point heights.

15. The pneumatic tire according to claim 1, wherein
one of the main grooves includes point heights and the other of the main grooves is straight shaped; and
the land portion includes closed lug grooves that are connected to the one of the main grooves including the point heights and closed with respect to the other of the main grooves that is straight shaped.

16. A pneumatic tire having a tread pattern, the tire comprising a tread portion including
at least three circumferential main grooves extending in a tire circumferential direction, one of the circumferential main grooves provided on a tire center line of the tire; and
at least two land portions on opposite sides of the one circumferential main groove, each of the land portions provided between two of the circumferential main grooves and extending in the tire circumferential direction, each of the land portions including a bulging portion bulging in an arc shape in a tire radial direction as a sectional outline of a tread surface of the land portion and chamfered portions connected to the bulging portion and extending straight toward respective groove walls of the circumferential main grooves,
a portion of the bulging portion bulging in the tire radial direction with respect to a virtual tread profile line of a tire tread surface of the tread portion including opposite contact patch ends of the tire, the virtual tread profile line being determined by an arc shape of a radius of curvature in a sectional shape of the tread portion,
a maximum bulging amount of the bulging portion with respect to the virtual tread profile line ranging from 0.1 mm to 0.8 mm,
the chamfered portions being provided on opposite sides of the bulging portion in a tire width direction, such that the bulging portion begins at respective outward ends of the chamfered portions that are located outwardly beyond the virtual tread profile line, respective inward ends of the chamfered portions opposite to the respective outward ends are located inwardly of the virtual tread profile line, and the chamfered portions cross the virtual tread profile line, and
at least one of the circumferential main grooves changes a groove position in a first wave shape in the tire width direction on the tire tread surface and in a second wave shape in the tire width direction on a tire tread groove bottom, a cycle of the first wave shape is longer than a cycle of the second wave shape, groove walls of the at least one of the circumferential main grooves connected between the tire tread surface and the tread groove bottom are inclined surfaces, with inclination angles of faces of the inclined surfaces changing along the tire circumferential direction and the inclination angles being in a range of 10 to 40 degrees.

17. The pneumatic tire according to claim 16, wherein
the virtual tread profile line is determined by a first arc shape of a first radius of curvature; and
the bulging portion bulges in a second arc shape of a second radius of curvature which is less than the first radius of curvature in a tire radial direction.

18. The pneumatic tire according to claim 16, wherein
each of two of the three main grooves includes point heights and the other of the three main grooves is straight shaped.

19. The pneumatic tire according to claim 18, wherein
each groove bottom of the two main grooves having the point heights is disposed in one half of the tread pattern with respect to the tire center line.

* * * * *